Oct. 26, 1926.
E. STEVENS
1,604,496
HAND PROPELLED VEHICLE
Filed Sept. 10, 1924    2 Sheets-Sheet 1
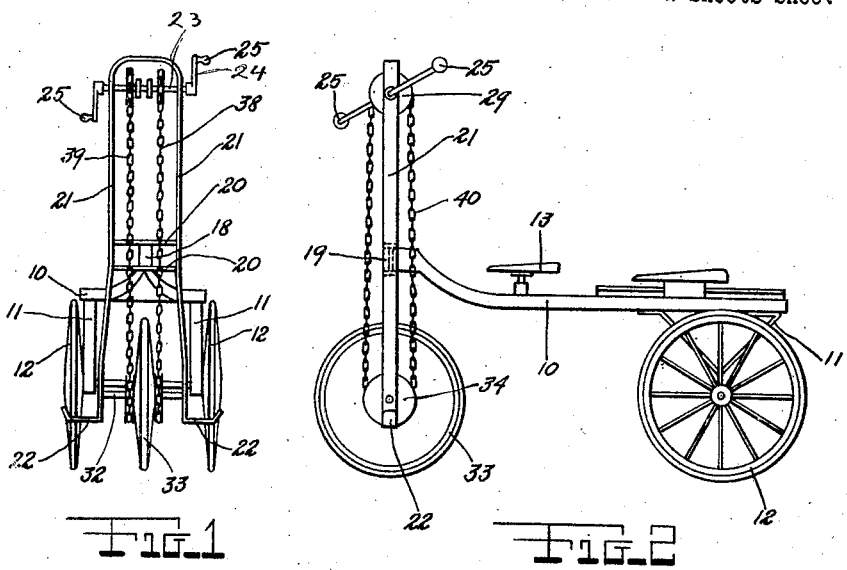
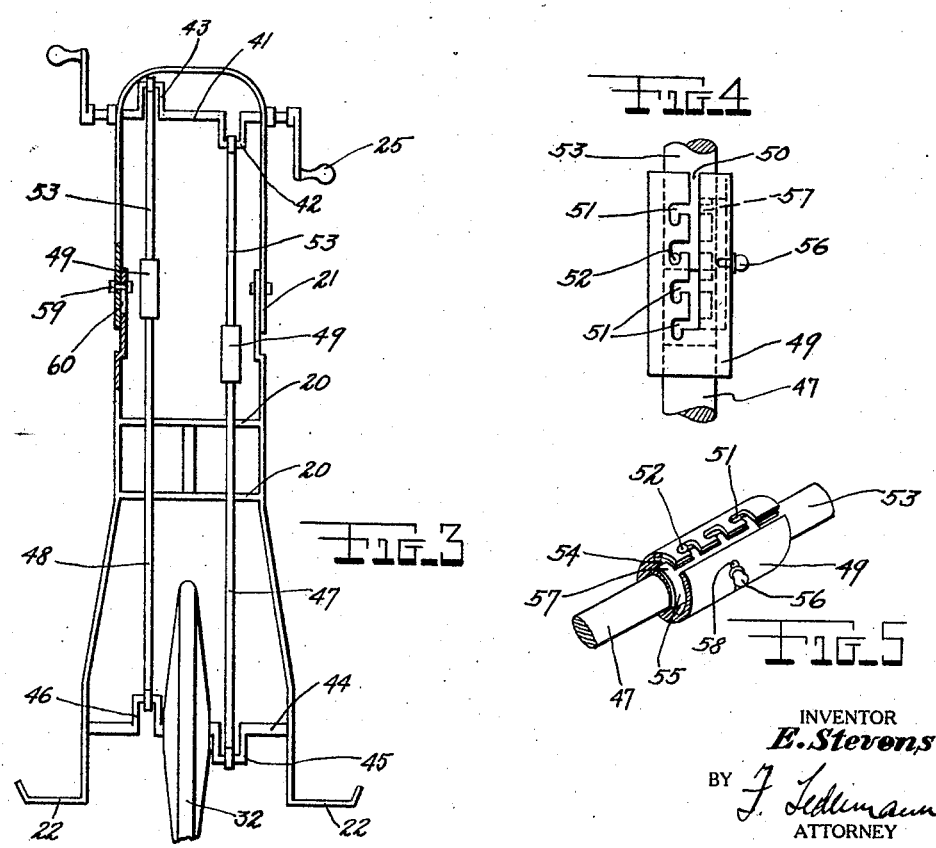
INVENTOR
E. Stevens
BY
ATTORNEY Oct. 26, 1926.
E. STEVENS
1,604,496
HAND PROPELLED VEHICLE
Filed Sept. 10, 1924   2 Sheets-Sheet 2
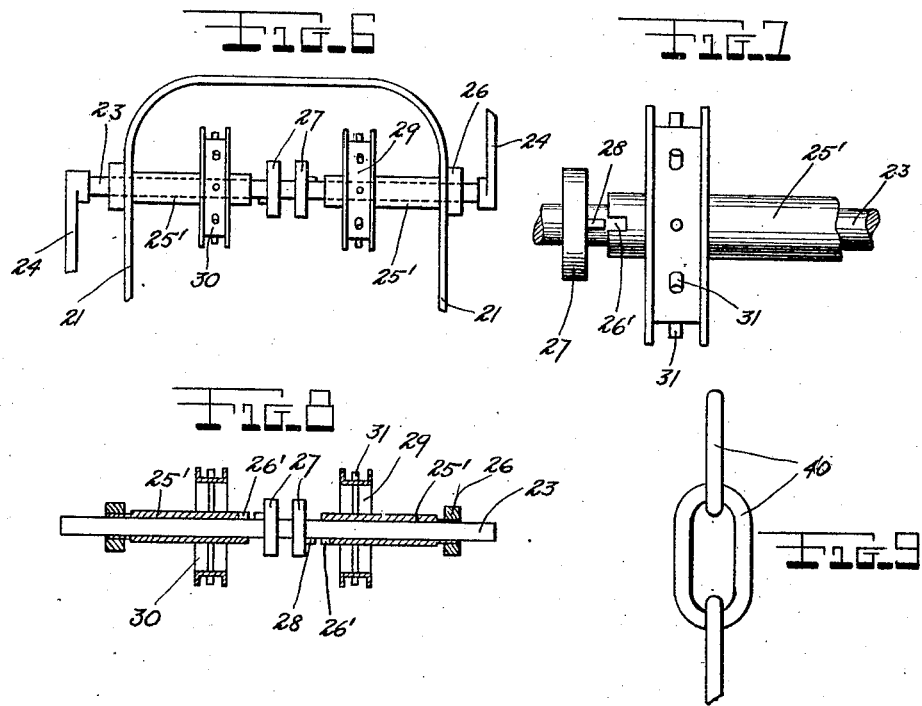
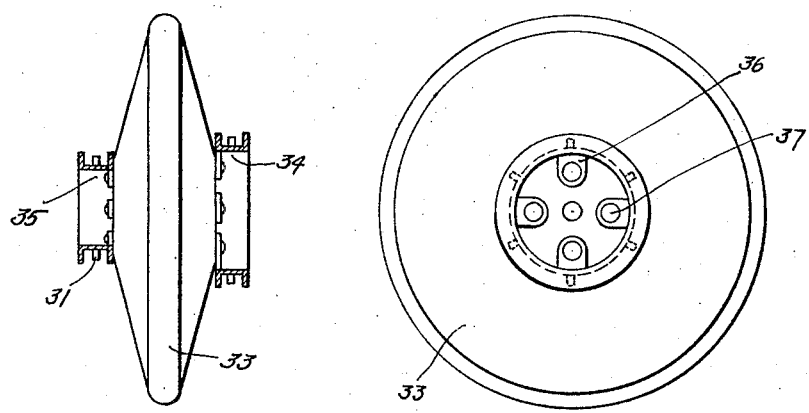
INVENTOR
*E. Stevens*
BY *J. Lederman*
ATTORNEY Patented Oct. 26, 1926.

1,604,496

UNITED STATES PATENT OFFICE.

EDWARD STEVENS, OF MANISTEE, MICHIGAN.

HAND-PROPELLED VEHICLE.

Application filed September 10, 1924. Serial No. 736,811.

The main object of this invention is to provide a hand propelled vehicle adapted to be used by children, and which may be steered in a selective manner by either the hands or feet.

Another object is to provide a hand propelled vehicle having a pair of opposing cranks mounted on the ends of the shaft, said shaft having chain pulleys rotatably mounted thereon and locked to the shaft by a novel clutch. The pulleys are of different sizes to permit the variation of speed and power in the propulsion of the vehicle.

Still another object is to provide a hand propelled children's vehicle, the means of locomotion being manually operated cranks which may be elongated to suit the differences of dimension between various sizes of frames.

These and other objects will become apparent in the description below, in which characters of reference refer to like-named parts in the drawing.

Referring briefly to the drawing, Figure 1 is a front elevational view of the vehicle.

Figure 2 is a side elevational view of the same.

Figure 3 is a front elevational view of the modified form of propelling means.

Figure 4 is an elevational view showing the means employed for extending the crank connecting rods and the means for securing said rods in locked position.

Figure 5 is a perspective view of the same, showing a portion of the coupling sleeve broken away to expose the curved locking plate.

Figure 6 is a fragmentary elevational view of the driving means and clutch mechanism.

Figure 7 is an enlarged fragmentary elevational view of the clutch mechanism in disengaged position.

Figure 8 is a sectional elevational view taken longitudinally thru the driving means and clutch mechanism.

Figure 9 is an elevational view of the driving chain.

Figure 10 is an elevational view of the traction wheel, showing the chain pulleys in sectional view mounted on said wheel.

Figure 11 is a side elevational view of Figure 10.

Referring in detail to the drawing, the numeral 10 indicates a longitudinal frame which constitutes the body of the vehicle and has mounted on its bottom face brackets which support a shaft on the ends of which rear traction wheels 12 are mounted. The frame 10 has a sleeve at its forward end in which the shank of a removable seat 13 is inserted. The forward end of the frame 10 merges toward a common point at which a sleeve 18 is provided and in said sleeve a pivot stud 19 is retained. The pivot stud is mounted between two horizontal plates 20 which form braces between the sides 21 of a vertical frame which is formed of a continuous strap having a return bend at its upper end, and at the lower ends, said strap is bent outwardly at an angular plane to the sides 21 and forms foot rests 22.

A driving shaft 23 spans the distance between the sides 21 of the vertical frame and passes thru said sides and is capable of being freely rotated. To the ends of said shaft, cranks 24 on which handles 25 are provided, are rigidly mounted. Sleeves 25' are rotatably supported on the shaft 23 between the sides 21 of the vertical frame and these sleeves are provided with reduced portions which pass thru the frame and extend somewhat beyond the exterior sides of members 21. To these extending portions, collars 26 are rigidly mounted and are adapted to prevent said sleeves from sliding transversely on the shaft 23. The mutually adjacent ends of the sleeves 25' have slits 26' therein, and adjacent each slot is a flange 27 which is fixedly mounted on the shaft 24 and has a stud 28 projecting from the face of the flange which extends toward its respective sleeve 25'. On one of the sleeves 25' near the slotted end, a chain pulley 29 is mounted and the opposite sleeve is also provided with a chain pulley 30 of identical construction and dimension. These chain pulleys have an annular rim whose edges are turned outwardly to form annular flanges between which at spaced-apart intervals, pins 31 extend radially from the peripheries of the pulleys. A support shaft 32 spans between the sides 21 and is anchored in said sides. On said shaft, a traction wheel 33 is rotatably mounted. All of said traction wheels comprising members 12 and 13 are provided with tires to adapt the vehicle for smooth and easy riding. On one face of the forward traction wheel 33, a chain pulley 34 is mounted which is of somewhat similar construction to the pulleys 29 and 30, the identical characteristics being the studs and the annular side flanges, the studs being arranged the same distance apart as the upper pulley 29. On the opposite face of the traction wheel 33, a similar but smaller pulley 35 is mounted. These pulleys 34 and 35 have ears 36 which extend toward the axis of the wheel and said ears are provided with holes thru which rivets 37 pass for securing the said members rigidly to the traction wheel 33. The pulley 34 mounted on one face of the wheel 33, is connected to the pulley 29 by a chain 38, and the pulley wheel 35 on the opposite face of the traction wheel 33 is similarly connected to the pulley 30 by a chain 39. A section of the chain is shown in Figure 9 in which the usual type is illustrated, that is, the chain is comprised of a series of elongated loops 40 which are successively interlocked.

In the modified form of device, the vehicle is driven by the chains 38 and 39 and permit variation of the speed when the shaft 24 has been adjusted or moved to the desired position to accomplish the change in speed. In Figure 3, the preferred form of driving means is shown in which the vertical frame supports at its upper end a horizontal shaft 41 on which a pair of opposing cranks 42 and 43 are formed. At the lower end of the frame, an additional shaft 44 which supports the traction wheel 33 is also provided with opposing cranks 45 and 46, the cranks 45 and 42 being connected by a rod 47, and the cranks 46 and 43 being connected by a rod 48. Vehicles of this type are made in various sizes, and in order to facilitate their production, the rods 47 and 48 are made extensible so that they may be applied to any size of vehicle. The rods are divided into two members which are used end to end and at their adjacent ends, a sleeve 49 is slipped over said rods to couple the same. The lower end of the sleeve is permanently fixed to the lower portion of the rods 47 and 48 and a slot 50 is provided in the sleeve coupling and extends longitudinally thru the greater portion of its length. A plurality of bayonet slots 51 spaced apart from each other communicate with the slot 50 and any of said bayonet slots are adapted to receive a pin 52 which projects radially from the upper members 53 of the rods 47 and 48. A circular channel 54 extends longitudinally in the sleeve 49 and in said channel, a curved plate 55 is mounted from which a stud 56 extends. Said curved plate has a plurality of projections 57 which are of the same dimensions as the width of the bayonet slots 51 and are adapted to enter into said bayonet slots when the stud 56 is moved circularly around the sleeve 49, said stud being movable in a slot 58.

In assembling a vehicle of the crank operated type, it may be found that the height of the shaft 41 is not in a comfortable position for the child, being either too high or too low for the arms. When this arises, adjustment of the rods 47 and 48 and of the frame is necessary. As the sleeves 49 are permanently but rotatably mounted on the lower portions of the rods 47 and 48, said sleeves are rotated after the crank shaft 41 is rotated in order to permit the pin 52 to be lifted out of the vertical portion of the bayonet slot and the curved plate 55 is rotated out of the slots 51 and 50 so that the pin may have free passage from the bayonet slots into the slot 50. By loosening the bolt 59, the upper portion of the frame 21 may be lifted or lowered as said bolt is slidable in a slot 60 formed in the lower portion of the frame 21. This adjustment permits raising or lowering the position of the crank shaft 41 accordingly as is convenient and comfortable for the operator of the vehicle.

In using the vehicle, a child sits upon the seat 13 and bends the knees and swings the legs forwardly so that the feet are supported on the foot rests 22. The vehicle is propelled by rotating the cranks 24 which are provided with handles 25. When the flanges 27 are in central position, as indicated in Figure 6, and the cranks 24 are rotated, the shaft is rotated therewith, but the traction wheel 33 will not be rotated as neither of the pulleys 29 or 30 are in this position locked to the shaft. To lock the pulleys 29 or 30 to the shaft, either of the cranks are urged in the desired direction, that is, when the pulley 30 is to be locked to the shaft 24, the crank farthest away from said pulley will be urged toward the pulley. This causes the pin 28 mounted on the face of the nearest flange 27 to engage in the slot 26', formed in the sleeve 25', and as said sleeve and pulley 30 are integral, the shaft will be locked to the sleeve and will cause the pulley to rotate. When desiring to rotate the pulley 29, the cranks 24 are urged transversely in an opposite direction to cause the pins 28 to engage the slots of the sleeve on which said pulley 29 is mounted. It is to be noted that as one pulley sleeve is locked to the shaft, the opposite one is released and rotates idly. Both pulleys 29 and 30 are of the same diameter, but the pulley 29 is engaged with the pulley 34 which is of a larger diameter than the pulley 35, the latter being connected by the chain 39 to the pulley 30. From Figures 6, 8, and 10, it is obvious that when the pulley 30 is locked to the shaft 24, and the latter is rotated at a given speed, the traction wheel 33 will rotate a greater number of times than when the pulley 29 is locked to the shaft and rotates the wheel 33 thru the medium of the pulley 34, due to the difference in diameters of the wheels 34 and 35.

When the pulley 34 is being driven by the pulley 29, greater power is possible as the speed of pulley 34 is less than when the pulley 35 is driven by the pulley 30. In the crank driving mechanism shown in Figure 3, no speed variation is possible, and a single speed is all that can be accomplished.

I claim:—

1. A vehicle comprising a body frame supported on wheels, a pivoted vertical frame, said frame being composed of two sections, an upper and lower, the upper frame being slidable longitudinally on the lower frame, bolts securing said frame in adjusted position, a traction wheel mounted rigid with a crank shaft, the upper supporting an additional crank shaft, said rods being sectional, and means for extending said rods.

2. A vehicle comprising a body frame supported on wheels, a pivoted vertical frame, said frame being composed of two sections, an upper and lower, the upper frame being slidable longitudinally on the lower frame, bolts securing said frame in adjusted position, a traction wheel mounted rigid with a crank shaft, the upper supporting an additional crank shaft, said rods being sectional, said rods being used end to end, a coupling sleeve joining said rods, a pin on one rod, said sleeve having a slot and bayonet slots communicating with the first-named slot, said pin being engageable in said slots and a curved plate having extensions thereon being slidable in a channel in the sleeve for locking the pin on the end of the rod in locked position in the bayonet slot.

In testimony whereof I affix my signature.

EDWARD STEVENS.